United States Patent [19]

Rockenfeller

[11] Patent Number: 4,822,391
[45] Date of Patent: Apr. 18, 1989

[54] METHOD AND APPARATUS FOR TRANSFERRING ENERGY AND MASS

[76] Inventor: Uwe Rockenfeller, 1453 Rawhide Rd., Boulder City, Nev. 89005

[21] Appl. No.: 115,820

[22] Filed: Nov. 2, 1987

[51] Int. Cl.$^4$ ................................. F25J 5/00
[52] U.S. Cl. ............................ 62/12; 62/376; 62/541; 62/544; 55/208
[58] Field of Search .............. 62/12, 376, 532, 541, 62/544; 55/208

[56] References Cited

U.S. PATENT DOCUMENTS

| | | | |
|---|---|---|---|
| 2,134,701 | 11/1938 | Brewster | 62/375 |
| 3,036,440 | 5/1962 | Feinman | 62/375 |
| 3,126,334 | 3/1964 | Harlow | 62/533 |
| 3,248,890 | 5/1966 | Oman | 62/541 |
| 3,501,275 | 3/1970 | Sailer et al. | 62/541 |
| 3,675,436 | 7/1972 | Ganiaris | 62/533 |

FOREIGN PATENT DOCUMENTS 560451 2/1958 Belgium.

Primary Examiner—Ronald C. Capossela
Attorney, Agent, or Firm—Jerry R. Seiler

[57] ABSTRACT

Energy and mass are transferred in a system utilizing a gaseous refrigerant which is mixed and sorbed (absorbed/adsorbed) with a liquid carrier selected from the group consisting of long chain alcohols, ethers, glycols, glycol ethers, sebecates, phthalates, aldehydes and ketones, and sorbate/liquid mixture then combined with a particulate solid capable of forming a solid/gas compound with the gaseous refrigerant. The process is carried out in a mass and heat exchange apparatus capable of collecting and transferring the energy created by the formation or dissociation of the solid/gas compound.

14 Claims, 3 Drawing Sheets

METHOD AND APPARATUS FOR TRANSFERRING ENERGY AND MASS

BACKGROUND OF THE INVENTION

The formation of sorbate/sorbent complexes utilizing polar adsorbate gases having a dipole moment to undergo a thermal chemical reaction forming a complex compound as an exothermic adsorption reaction are known. The employment of complex compounds as heat pump working fluids in state of the art systems is also known. Suitable adsorbate ligand gases such as water, ammonia and methanol combined with relatively inexpensive salts such as sodium chloride, calcium chloride, sodium bromide and strontium chloride as well as zeolites or charcoals combined with water, ammonia, methanol, lower alkanes, hydrogen, and solids/gas metal hydrides are relatively inexpensive systems and offer a highly advantageous and economical method of producing energy for refrigeration or cold storage systems. The process may also be reversed as an endothermic desorption reaction process whereby the materials may be recovered and used again.

It is to the use of such inexpensive and commercially advantageous energy and mass transfer systems that the method and apparatus of the present invention is intended.

SUMMARY OF THE INVENTION

The present invention incorporates a process in which the ligand adsorbate (absorbate) in the gaseous state is combined with a specially selected liquid in which the gas is absorbed. The resulting liquid mixture is exposed and preferably slurried with the particulate solid with which the ligand forms a complex in an adsorption reaction. The energy released by the complex-forming reaction in which the liquid phase gives up or releases the ligand to the solid to form the complex is captured or transferred in an apparatus incorporating heat exchange surfaces. Alternatively, the heat exchange may occur outside the apparatus using the liquid as the heat transfer fluid. The gas and liquid may be combined in the apparatus itself or combined in a separate apparatus and then introduced into the heat transfer apparatus containing the particulate solid. Variations in the process as well as design features of a number of alternative apparatus embodiments will be disclosed in the detailed description.

DETAILED DESCRIPTION OF THE PREFERRED EMBODIMENTS

Figure 1:
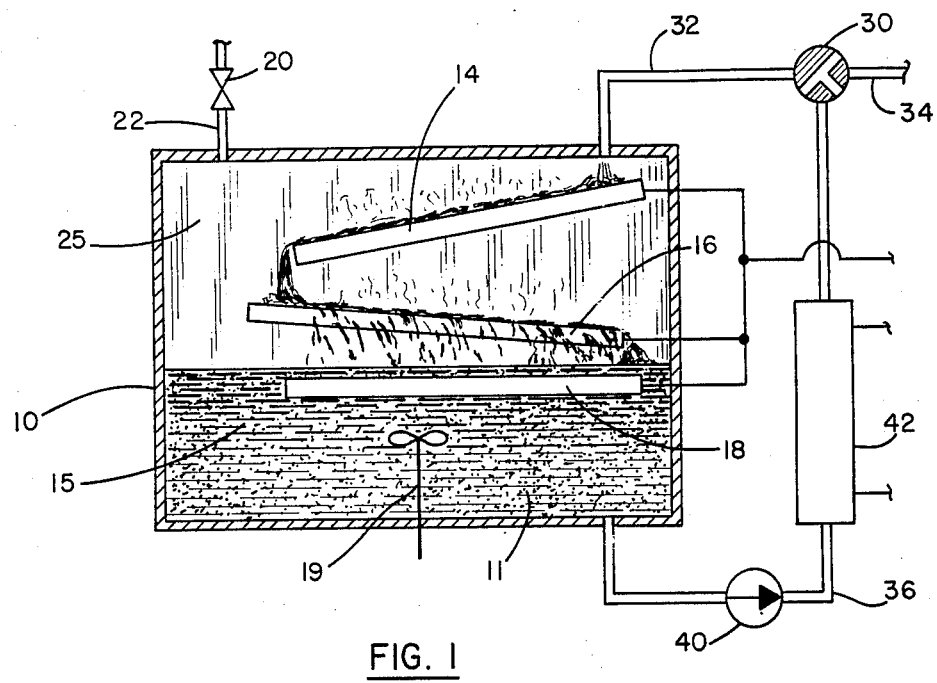
FIGS. 1-6 are schematic sectional views illustrating different apparatus embodiments and structures which may be used in the various processes according to the invention.

The gaseous refrigerants used in the processes of the invention are preferably gases having a dipole moment, i.e., one or more lone electron pairs such as water, ammonia, $C_1$ or $C_2$ alcohols (methanol, ethanol) or gases which can cause bond breaking reactions such as carbon dioxide, hydrogen, $C_1$, $C_2$ alkanes (methane, ethane) $C_1$, $C_2$ amines (methyl or ethyl amines) or pyridine or the use of such gases in inclusion compounds where the gases are physically adsorbed.

In the process, these gaseous ligands are combined with particulate solids with which they form a complex compound, in the case of polar gases, or reaction compounds in a sorption (adsorption/absorption) reaction, normally an exothermic reaction or inclusion compounds. The preferred solids are salts of alkali or alkaline earth metals, and transition and rare earth metals. More specifically the halide, nitrate, sulfate, oxide, chlorate, perchlorate or hydroxide salts of these metals are used. Specific examples of readily available and relatively inexpensive salts include aluminum chloride, calcium chloride, strontium chloride, sodium chloride, sodium bromide and the like. When combined with the gaseous ligands, the resulting solid/gas compounds include ammoniated, hydrated, amine and alcohol complex compounds, metal hydrides, metal oxide-metal carbonate, metal oxide-metal hydroxide complexes. In addition to the metal salts, a special class of particulate solids including zeolite (aluminum sodium or calcium silicates), clay (aluminum silicate), or activated coal or carbon, which materials have high adsorptivity for gases, are also useful in some systems according to the invention.

A special requirement of the process of the invention is in utilizing a liquid as a carrier for the refrigerant gas to and from the particulate solid. A suitable liquid is one which has some affinity for the gas refrigerant such that the gas may dissolve into the liquid whereby the liquid then is simply a physical carrier for the gas, or the liquid may be one in which there is sorption (adsorption/absorption) reaction to form a complex with the gas. However, such complex formation must be of the character whereby the liquid does not have an affinity for the gas greater than that of the gas and the solid with which it is to react to form the solid/gas compounds in the mass energy transfer system according to the invention. Suitable liquids must also be chosen which do not dissolve the solid adsorbent to any considerable extent, nor must the liquid cause agglomeration of the solid so that mass diffusion might otherwise be hindered during adsorption or desorption. A most important condition is that the liquid must have a vapor pressure considerably lower than the partial pressure of the gas. Moreover, such vapor pressure differential must prevail throughout the entire operating range of the process of the invention including adsorption and desorption. To meet the requirement, preferably, there is at least a 25° C. difference between the boiling points of the liquid and gaseous refrigerant. The liquid must also remain in the liquid state during adsorption and desorption conditions of the process. Moreover, the liquid is to keep the solid in a pumpable suspension or it must separate from the solid after the sorbate (adsorbate/absorbate) exchange. Finally, where zeolite, activated carbon (coal) and clays are used, the molecular dimension of the liquid must be larger than the aperture of the sorbent window such that the liquid does not occupy the sorption sites.

Suitable liquids meeting the aforesaid condition may be selected from the following group and include long chain alcohols, preferably aliphatic carbon chains having at least seven carbon atoms and the isomers thereof, ethers, glycols, glycol ethers, sebecates, phthalates, aldehydes and ketones, again preferably those having alkyl chains of at least seven carbon atoms. Specific examples of suitable liquids include octanol, diethylene glycol, diethylene glycol diethyl ether, diethyl sebecate, diethyl phthalate and succinaldehyde. Such liquids are by the way of example only and are not intended to be limiting.

In carrying out the process of the invention, depending on the nature of the individual gaseous, liquid, and particulate solid components of the system, it may be advantageous to first form a mixture or slurry of the liquid and particulate solid and then introduce the gaseous refrigerant which first complexes with the liquid carrier which liquid mixture is then mixed with the solid at which time the adsorption reaction will occur. In yet other cases, it may be preferred to first mix the liquid with the gas to form the liquid complex in a separate vessel, which liquid mixture is then introduced into the energy and mass transfer apparatus for carrying out the adsorption process. It is to be understood that the term "sorption" may be either adsorption or absorption, depending on the nature of the specific reactance, or the term adsorption may be used itself to indicate either specific adsorption or absorption. Moreover, although a process may be disclosed as being an adsorption reaction in a single vessel for transferring mass and energy, the reverse desorption reaction may be carried out in the same vessel by changing the temperature and/or pressure in the vessel, as would be desirable in an energy storage system. Alternatively, separate vessels may be used for the adsorption and desorption reactions, respectively, as would be preferred in a heat pump system. Thus, although a single reaction vessel may be disclosed in specific embodiments for carrying out an adsorption reaction, again, that system is not to be so limited since the reverse desorption reaction may be carried out under suitable, selected conditions and which are known to those skilled in the art. Moreover, specific components of the system may be chosen from those disclosed herein to take advantage of the preferred, selected conditions or uses desired of the energy and mass transfer system disclosed and will also be understood to those skilled in the art.

In FIG. 1 there is illustrated a first embodiment of an apparatus useful in carrying out the mass and energy transfer according to the invention. In the apparatus shown, a container or vessel 10 of suitable design is shown in which are located a plurality of heat exchange surfaces 14, 16 and 18, connected by suitable means for transferring energy to and from the surfaces. It will be understood that the heat exchange surfaces may include heat exchange means such as coils, conduits, and the like in which a heat transfer composition is moved to and from outside heat exchange source, such as a separate heat pump, evaporator, condenser, or the like. In the apparatus illustrated herein, it is also to be understood that only a schematic representation is made for such components and the specific design of such components and the functioning thereof in an actual assembly apparatus would be understood by those skilled in the art. The interior of the vessel includes a cavity in which is located a reservoir area or section 11 and an open portion 25 at or near the top of the cavity. A suitable liquid and particulate solid are selected and introduced into the vessel cavity and mixed by a stirrer 19 or other means to form a liquid/particulate solid slurry 15. A slurry pump 40 pumps the slurry via conduit 36 from reservoir 11 past valve 30 and into the upper portion 25 of the vessel via conduit 32 such that the slurry is directed onto successive heat exchange surfaces 14, 16 and 18. In the apparatus shown, the heat exchange surfaces 14 and 16 are tilted relative to horizontal so that slurry pumped from the bottom of the vessel to the top via conduits 36 and 32 will first be directed onto an upper end of slanted or sloped first heat exchange surface 14 which slurry will then pass gravitationally down the surface and is directed onto the upper end of second heat exchange surface 16. The slurry will then pass gravitationally along that second heat exchange surface until it falls from the opposite lower end into the reservoir. It should be understood that any number of successive heat exchange surfaces may be used and those shown are for the purpose of illustration only.

The adsorbate in the form of a gaseous refrigerant of the type previously disclosed is introduced via valve 20 and pipe 22 into the upper open area 25 of vessel 10. Because of the affinity of the liquid selected for a specific selected refrigerant gas, the liquid will dissolve or adsorb the gas in the slurry mixture and because of the affinity of the solid adsorbent exceeding the affinity of the liquid for the adsorbate, the sorption reaction to create the energy and mass transfer will occur readily along the heat exchange surfaces. The heat created by the adsorption (absorption) reaction will then be transferred along the heat exchange surfaces. In the apparatus shown, an optional heat exchanger 42 may be used along conduit 36 where desired for further capture and transfer of the heat created by an exothermic adsorption reaction carried out in the process. Pipe 34 leading from valve 30 is also shown for directing the liquid/particulate solid slurry to and from a second container in the event a heat pump system is desired or is to be utilized.

Figure 2:
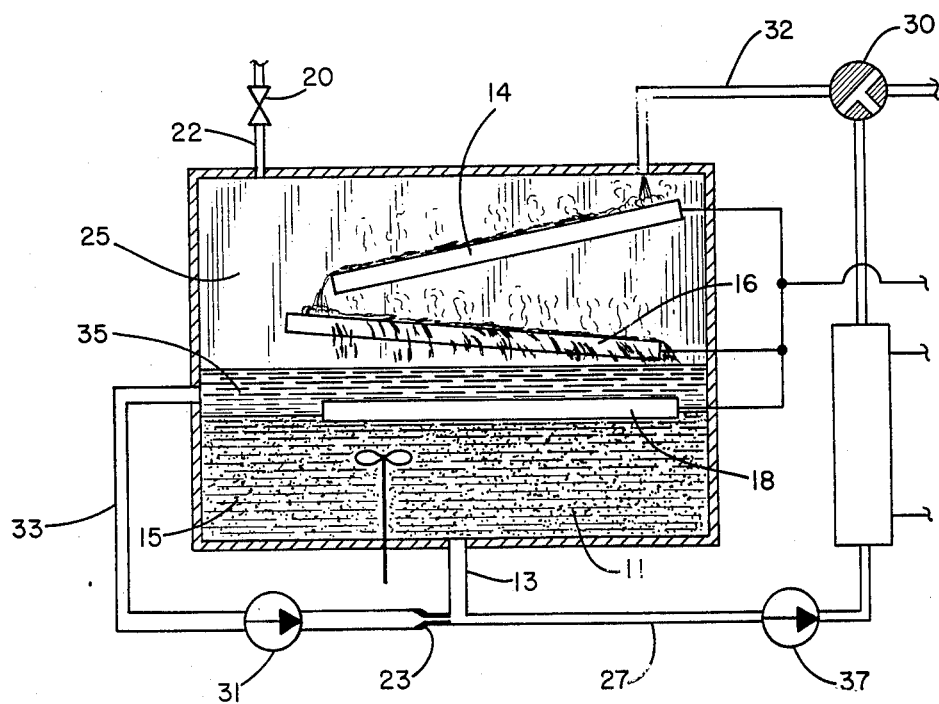

In FIG. 2 there is illustrated an apparatus of substantially similar design to that of FIG. 1 with the exception that a liquid has been selected which has a lower density or specific gravity as compared to the particulate solid or slurry such that the liquid 35 forms a separate layer on top of the slurry 15. The apparatus also includes conduit 33 and optional liquid pump 31 which direct liquid 35 to a venturi nozzle or apparatus 23 positioned relative to pipe 13 such that liquid passing through the venturi nozzle entrains slurry 15 from reservoir 11 due to the pressure drop created. Liquid 35 is mixed with slurry 15 as the two compositions meet downstream from venturi nozzle 23 which mixture is then directed along conduit 27 and pumped by slurry pump 37 to the upper portion of the reaction vessel via pipe 32 in a manner as previously described regarding FIG. 1. Otherwise, gaseous refrigerant is introduced into the vessel as previously described as is the mass and energy transfer on heat exchange surfaces 14, 16 and 18.

Figure 3:
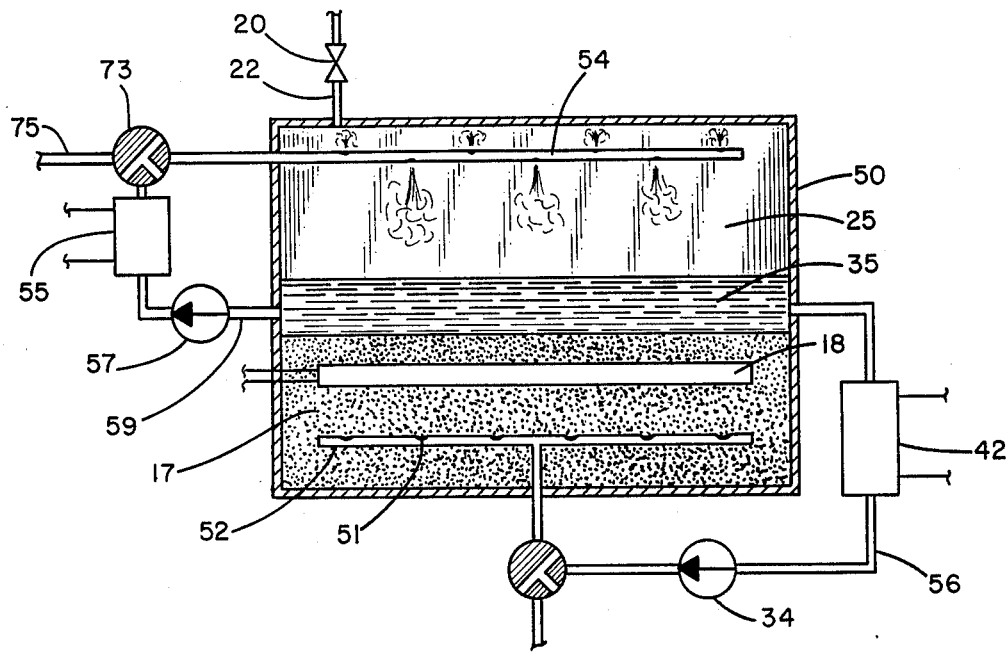

In FIG. 3 heat exchange and mass transfer vessel 50 is illustrated in a system in which liquid 35 has a lower specific gravity than particulate solid 17 such that two specific layers of these materials are formed. Liquid 35 from the liquid layer is pumped via pipe 56 and liquid pump 34 into a liquid distribution member 52 having a plurality of orifices 51 for directing the liquid into the bed or mass of particulate solids 17. Gaseous refrigerant is introduced into the vessel via valve 20 and pipe 22 where it is exposed and mixes with liquid 35 which is sprayed or otherwise distributed by distribution member 54. Such a distribution member may include spray nozzles or otherwise have suitable orifices or components for creating a falling film of liquid in the space of vessel 50 above liquid layer 35. In space 25, the liquid and gas combine to form a sorbate/liquid mixture which is then pumped and distributed into solid layer 17 as previously described. Pipe 59 and liquid pump 57 will be useful for pumping a portion of liquid 35 into distribution member 54. Optional heat exchangers 42 and 55 may be used along with heat exchange surface 18 in the vessel. Valve 73 and pipe 75 may be used for introducing and directing liquid 35 to and from vessel 50 to a separate heat exchange vessel if desired.

Figure 4:
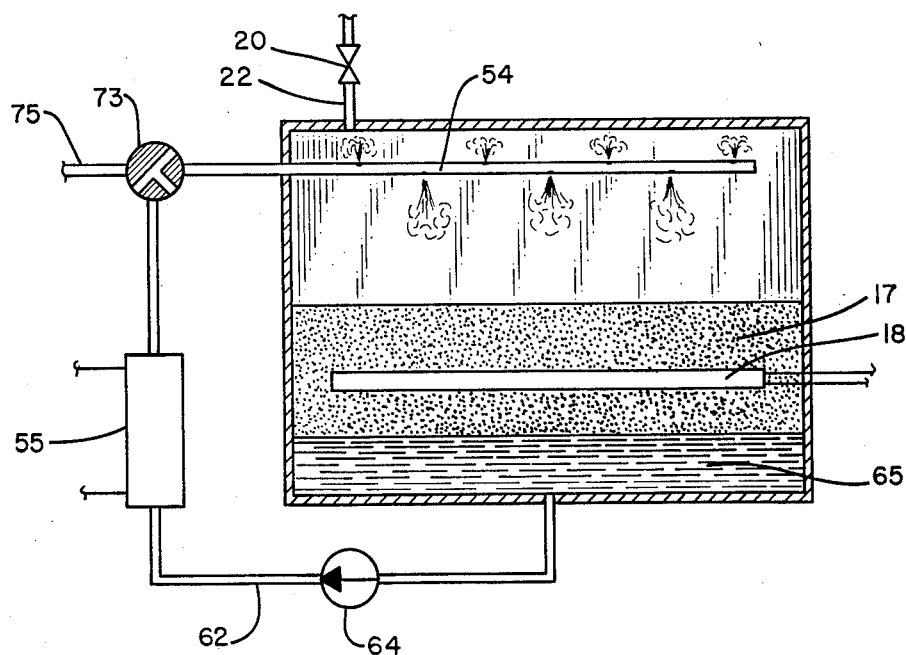

In FIG. 4 there is illustrated yet another apparatus embodiment and accompanying system in which liquid 65 is heavier than particulate solid 17. In this embodiment, the liquid/gaseous ligand mixture or complex has layered below the particulate solid because of its greater specific gravity and is pumped via pump 64 and pipe 62 to distribution member 54 where it is sprayed as a mist or falling film onto the upper surface of particulate solid 17. The liquid/ligand complex then passes through particulate solid 17 gravitationally resulting in the adsorption reaction whereby the gas adsorbate forms the complex compound with the solid in an exothermic (or endothermic) reaction with the energy transfer taking place on heat exchange surface 18. Again, any number of heat exchange surfaces or members may be present in the vessel and exposed to the particulate solid to fully take advantage of the energy transfer feature of the invention. Optional heat exchanger 55 may also be used since additional energy exchange may be desired with the liquid being pumped from the bottom of the vessel to distribution member 54.

Figure 5:
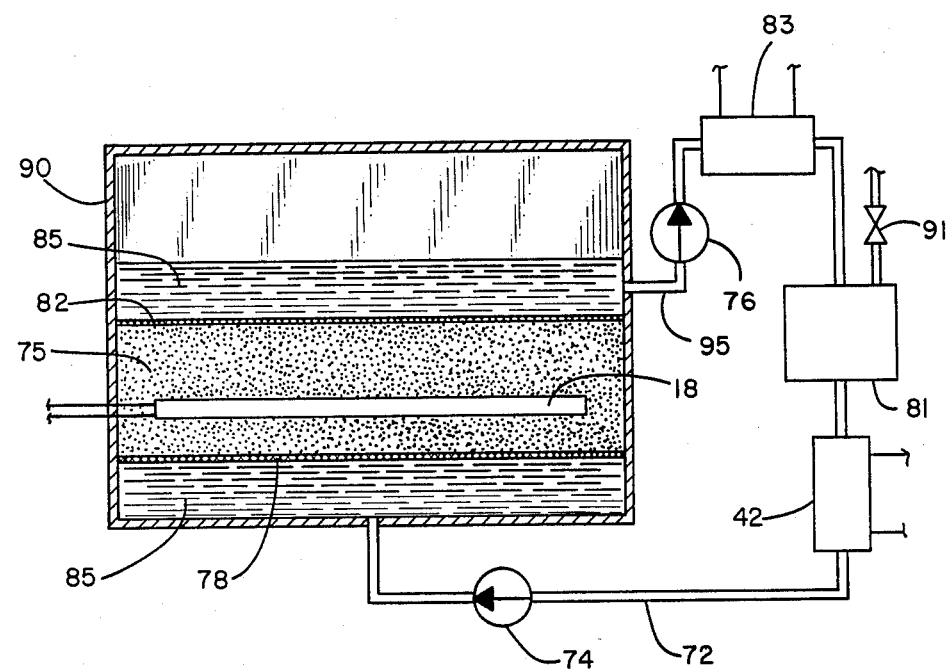
Figure 6:
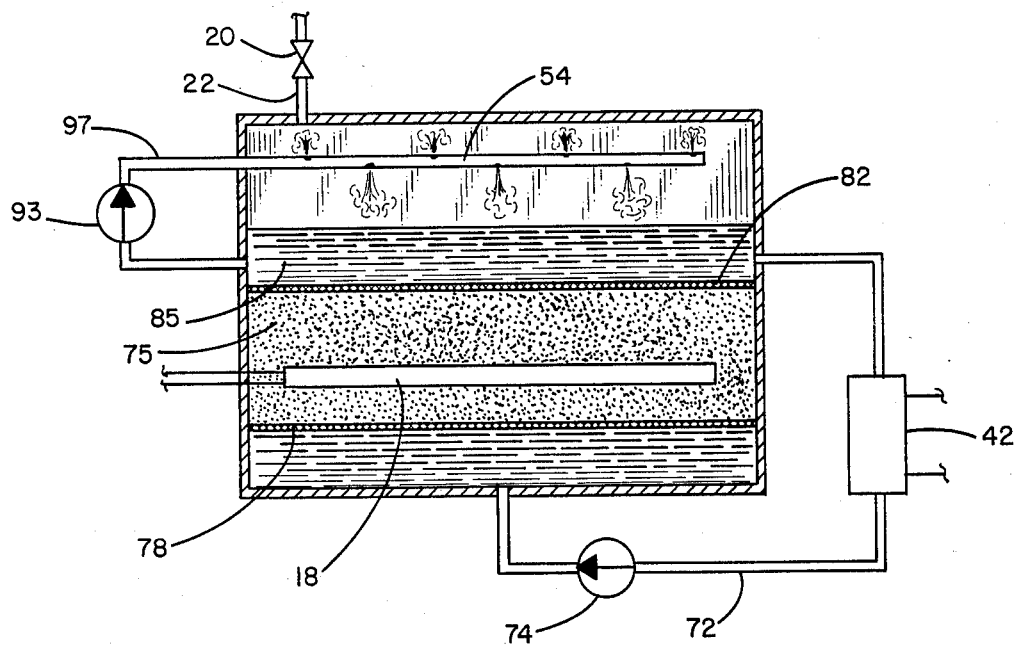

In FIGS. 5 and 6 there is illustrated yet another apparatus embodiment utilizing a porous wall for separating liquid layers above and below a particulate solid. In the apparatus shown in FIG. 5, the liquid/gaseous ligand mixture is formed outside of reactio vessel 90 in a separate vessel 81. The gaseous refrigerant is introduced into vessel 81 via valve 91. In this embodiment, the liquid is lighter or heavier than the solid so that it will pass upwardly or downwardly, respectively, through particulate solid 75 whereby the greater affinity of the particulate solid for the gaseous ligand yields a thermal chemical adsorption reaction forming a solid/gas compound as previously described. Two porous walls define an internal cavity or space for holding the particulate solid. Upper porous wall 82 extends between the side walls of vessel 90 and lower wall 78 also extends between the side walls to define the space in which particulate solid 75 is held throughout the process. The porous wall comprises a material in which the pores or orifices are large enough to allow liquid 85 to pass but will not allow passage of the particulate solid. Examples of such porous wall materials include cellulose acetate, polysulfones, palladium, polyethylene, polysoprene and polyvinylidene chloride. Where the liquid is lighter than the solid, it is pumped from the upper layer to below the particulate solid via pumps 76 and 74 through pipes 95 and 72. If a heavier than solid liquid is used, liquid is pumped from the layer below the particulate solid to the layer above the solid. Optional heat exchangers 42 and 83 may be provided for increasing the energy transfer efficiency of the system along with internal heat exchanger 18.

In FIG. 6 a further embodiment utilizes upper and lower porous walls 82 and 78, respectively. The gaseous refrigerant is introduced into reaction vessel via valve 20 and pipe 22 where it is combined with liquid 85 in space above the liquid layer with the liquid being distributed as a film or mist by distribution member 54 as previously described. Liquid 85 is pumped from the liquid layer above porous wall 82 via pump 93 and pipe 97. Pump 74 also pumps liquid 85 from the upper liquid layer to a lower liquid layer below porous wall 78, with the liquid passing upwardly through porous wall 78, or downwardly if the specific gravity is greater, through the particulate solid and to the upper liquid layer through porous wall 82. Heat exchangers 42 and 18 are provided for recovering and introducing energy to the system. It will be understood that in the apparatus in FIG. 6, with no outside or additional reaction vessel used for the reverse reaction, i.e., creating the endothermic process for desorbing the ligand/particulate solid complex, the desorbtion reaction may occur in the vessel itself which then serves as an energy and mass storage vessel. Thus, for example, where the adsorption reaction occurs at one set of temperature/pressure conditions between the gaseous refrigerant which is introduced via the liquid mixture through the particulate solid mass resulting in an exothermic adsorption reaction, with the energy from that reaction being transferred to and collected by heat exchangers 18 and 42, when it is desired to recover the energy from the exothermic reaction which is stored in the refrigerant/solid complex present in the vessel, new temperature and pressure conditions are created in the vessel for carrying out the endothermic desorption reaction with energy transfer taking place again at heat exchangers 42 and 18. For this purpose, any number of heat exchangers and their positioning may be used in the system for taking full advantage of the energy and mass transfer within the reaction vessel. This same energy storage system may be utilized in any of the previously described apparatus and system embodiments. Alternatively, the reaction vessels and system disclosed in the drawings and described above may be used as part of a heat pump system with the additional requirement of a separate reaction vessel for reacting with, heating or cooling the liquid/gaseous refrigerant components of the system. In the various embodiments discussed, the relative density of a liquid and solid are not so important so long as the liquid can be pumped into the vessel and be suitably mixed with the particulate solid to achieve the desired results. In the embodiment described in FIGS. 5 and 6, valves, pumps and suitable conduits communicating the vessels shown with one or more additional vessels for mass and energy transfer, as shown and discussed relative to the embodiments of FIGS. 1-4 may be used. Moreover, the apparatus shown and described herein may be used in combination with other vessels and apparatus for handling or treating the slurry, liquid and/or refrigerant gas compositions as part of larger heating or cooling or thermal storage networks or systems. Additional uses and advantages as well as equivalent features within the purview of the invention described herein will be evident to those skilled in the art.

I claim:

1. Apparatus in which mass and heat are transferred between a mixture of a liquid and particulate solid comprising a container having a cavity for receiving said mixture, a plurality of heat exchange surfaces in said cavity having means for transferring heat therefrom to and from said liquid and particulate solid in contact therewith, each said surface disposed at a different elevation from the other of said surfaces and tilted with respect to horizontal for gravitationally feeding said mixture successively along said surfaces from the uppermost surface, and first pump and conduit means for pumping said mixture from the bottom of said cavity to the uppermost of said heat exchange surfaces.

2. Apparatus of claim 1 including a heat exchanger in heat exchange communication with said first conduit means.

3. Apparatus in which heat and mass are transferred between a liquid and a particulate solid comprising
   a container having a cavity for receiving said liquid and said particulate solid and a refrigerant gas,
   an upper and a lower porous wall impervious to said particulate solid in said cavity and defininng a chamber therebetween for holding said particulate solid, and having an upper cavity portion above said upper wall and a sump cavity portion below said lower wall,
   first pump and conduit means for pumping said liquid between said sump cavity portion and said upper cavity portion, and
   a first heat exchanger in heat exchange communication with said first conduit means.

4. Apparatus of claim 3 including a second heat exchanger in said chamber.

5. Apparatus of claim 3 including distribution means in said upper cavity portion for dispersing liquid therein, and a second pump and conduit means for pumping liquid in said upper cavity to said distribution means.

6. Apparatus of claim 5 wherein said distribution means comprises spray or falling film means.

7. Apparatus in which mass and heat are transferred between a liquid and a particulate solid comprising
   a container having a cavity containing a layer of a mixture of said liquid and said particulate solid on the bottom thereof, a layer of said liquid lying on top of said layer of said mixture, and a space above said layer of said liquid,
   a plurality of heat exchange surfaces in said cavity having means for transferring heat therefrom to and from said liquid and particulate solid in contact therewith, at least two of said heat exchange surfaces being disposed in said space at different elevations from each other and tilted with respect to horizontal for gravitationally feeding said mixture successively along said surfaces from the uppermost surface,
   first pump and conduit means for pumping said mixture from the bottom of said cavity to the uppermost of said heat exchange surfaces, and
   second pump and conduit means for pumping said liquid from said layer of said liquid to said first conduit means,
   whereby said liquid from said liquid layer is mixed with said mixture in said second conduit means prior to being deposited on said uppermost of said heat exchange surfaces.

8. Apparatus of claim 7 including venturi pipe means at the junction of said first and second conduit means, said venturi pipe having an inlet communicating with said second conduit means and an outlet communicating with said first conduit means.

9. Apparatus of claim 8 including a heat exchanger in heat exchange communication with said first conduit means.

10. Apparatus in which heat and mass are transferred between a liquid and a particulate solid comprising
    a container having a cavity containing a first layer of a mixture of said liquid and said particulate solid and a second layer of said liquid contiguous with said first layer, said cavity including a space above said first and second layers,
    first distribution means for directing said liquid into said space,
    first pump and conduit means for directing said liquid from said layer thereof to said first distribution means, and
    a first heat exchnager in heat exchange communication with said first layer of said mixture in said cavity for directing heat to or from said mixture, and a second heat exchanger in heat exchange communication in said first conduit means for transferring heat to or from said liquid.

11. Apparatus of claim 10 including second distribution means for distributing said liquid into said first layer, and
    second pump and conduit means for directing said liquid from said second layer to said second distribution means.

12. Apparatus in which heat and mass are transferred between a liquid and a particulate solid comprising
    a container having a cavity for receiving said liquid, said particulate solid and a refrigerant gas,
    an upper and a lower porous wall impervious to said particulate solid in said cavity and defining a chamber therebetween for holding said particulate solid, and having an upper cavity portion above said upper wall and a sump cavity portion below said lower wall,
    first pump and conduit means for pumping said liquid between said sump cavity portion and said upper cavity portion, and
    a heat exchanger in said chamber.

13. Apparatus of claim 12 a liquid layer in said upper cavity and a space thereabove and including distribution means for dispersing liquid in said space, a second pump and conduit means for pumping liquid in said upper cavities to spray means for falling film means.

14. Apparatus of claim 13 wherein said distribution means comprises spray or falling film means.

* * * * *